June 11, 1935.  O. V. PAYNE  2,004,342
WEFT DETECTING MECHANISM FOR DROP BOX LOOMS
Filed July 16, 1934  3 Sheets-Sheet 1
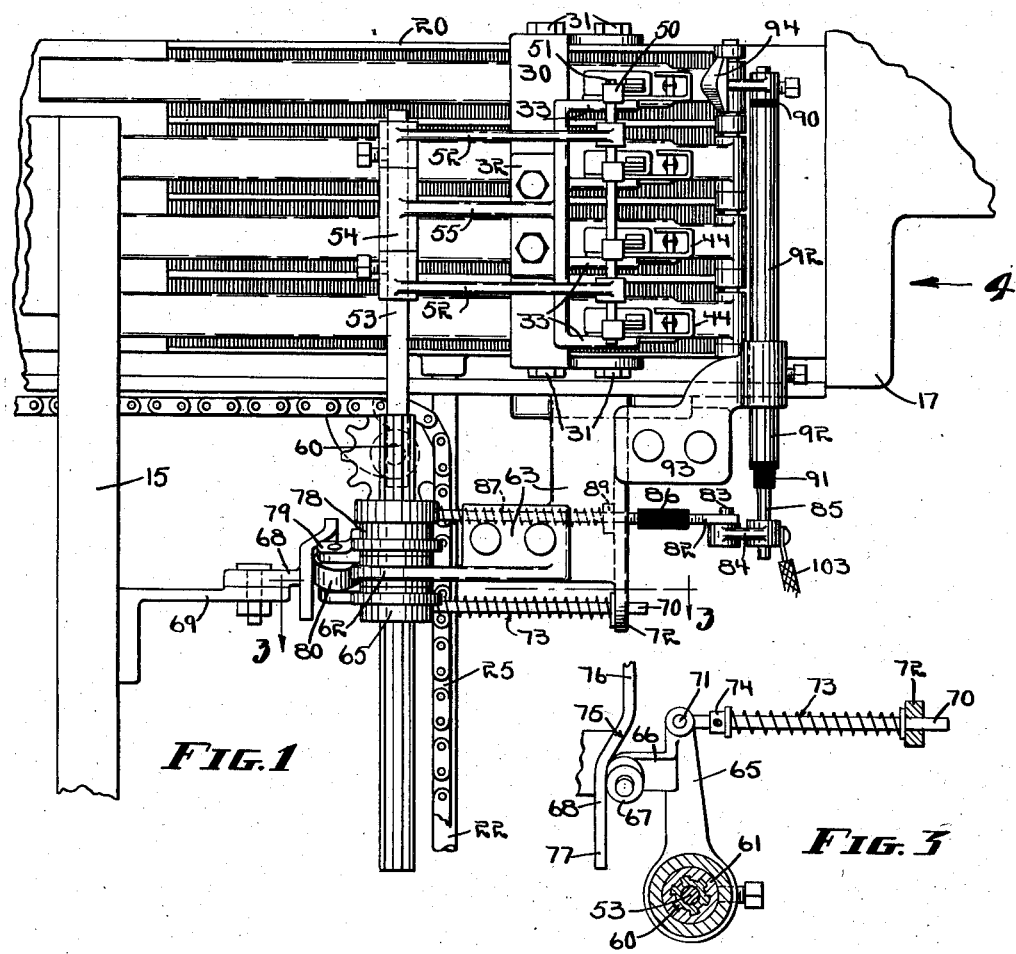
FIG.1
FIG.3
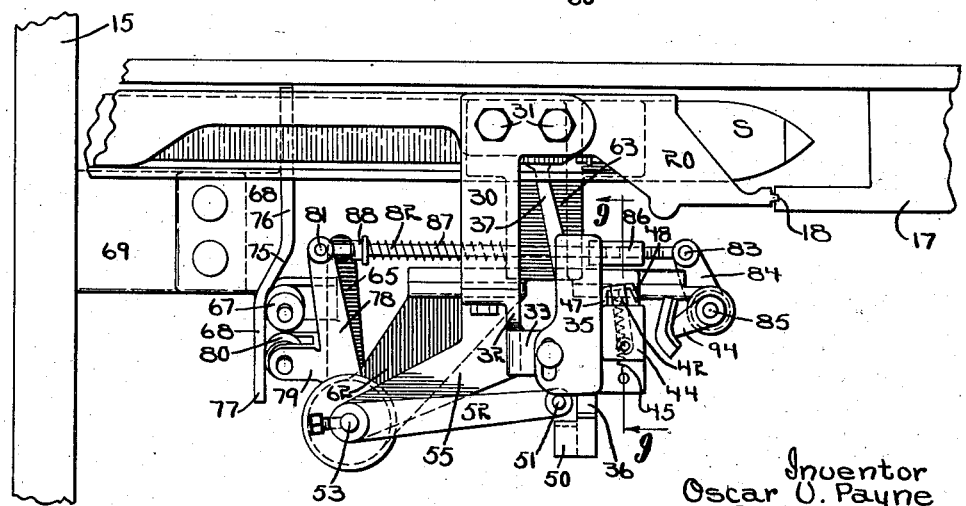
FIG.2
Inventor
Oscar V. Payne
Southgate Frey + Hawley
Attorneys

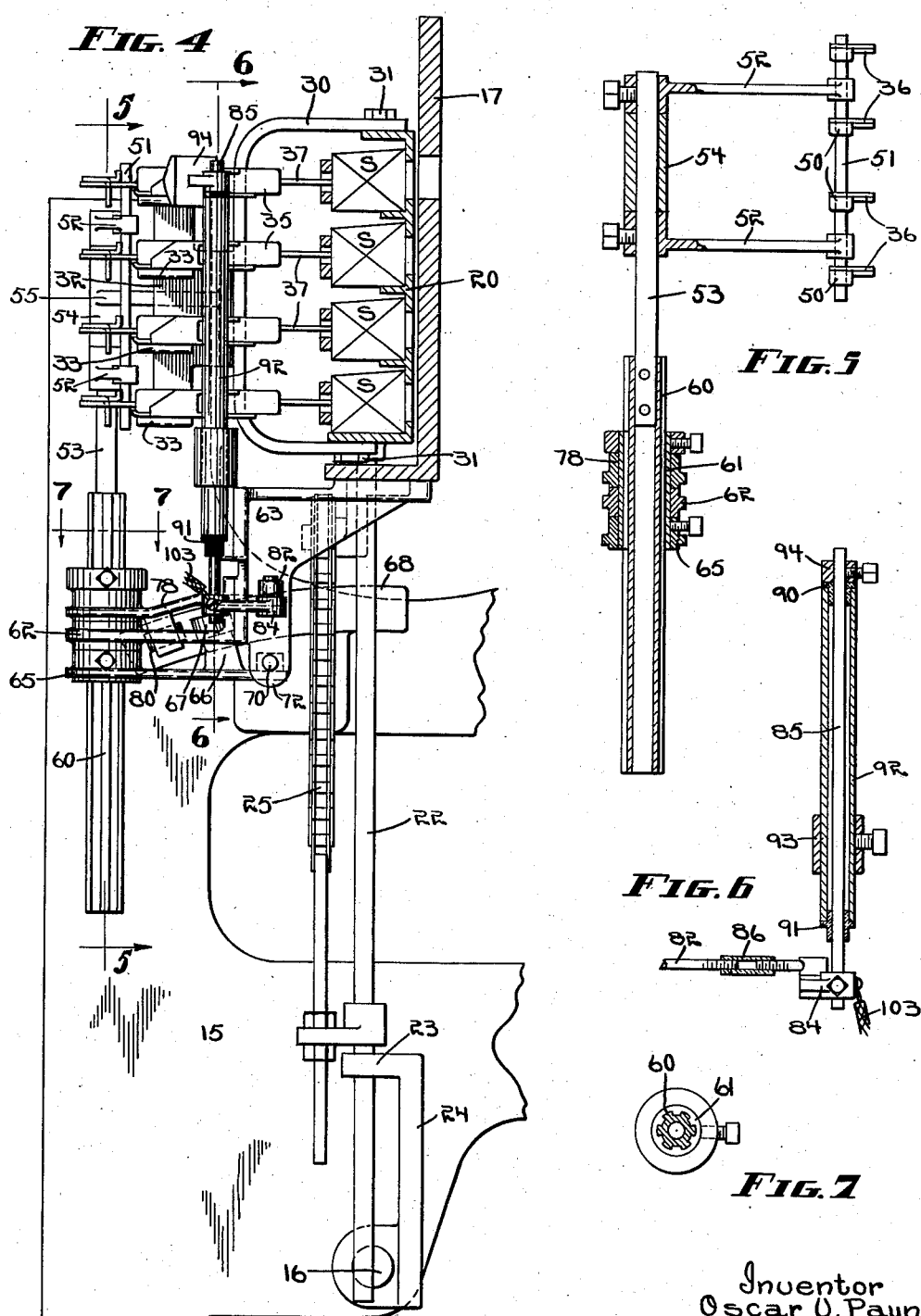

June 11, 1935. O. V. PAYNE 2,004,342
WEFT DETECTING MECHANISM FOR DROP BOX LOOMS
Filed July 16, 1934 3 Sheets-Sheet 3
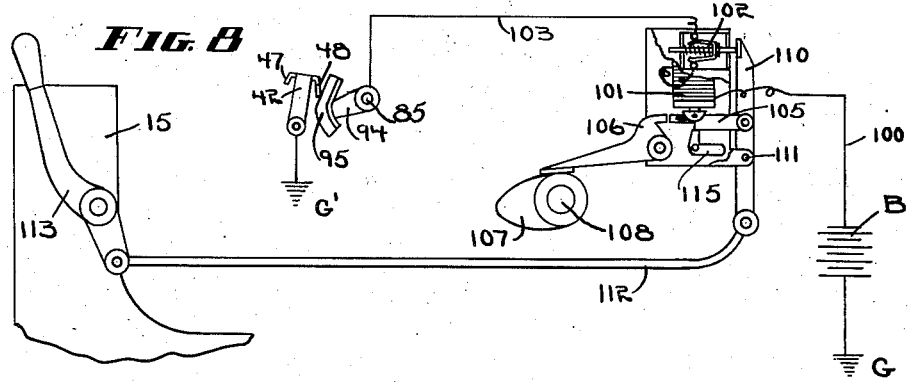
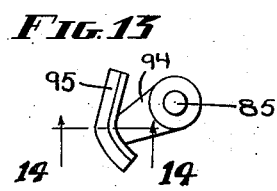
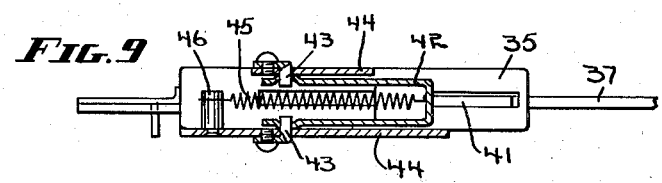
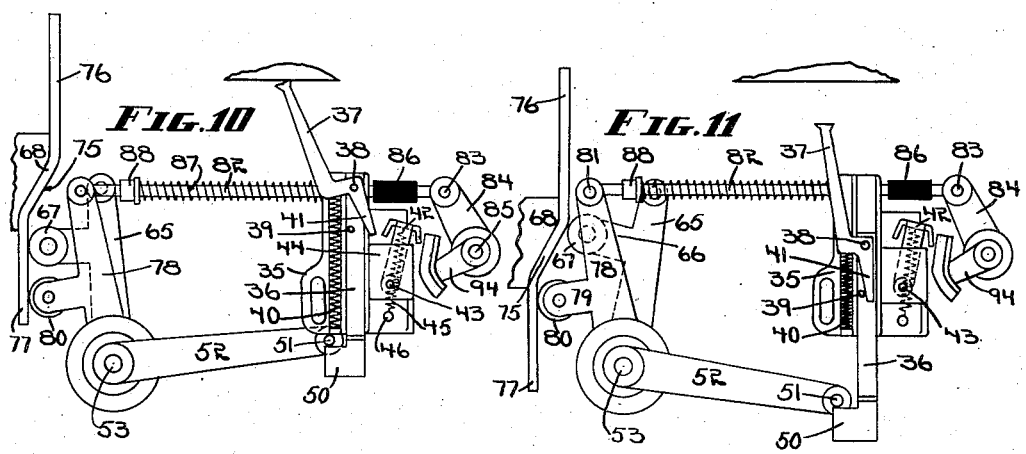
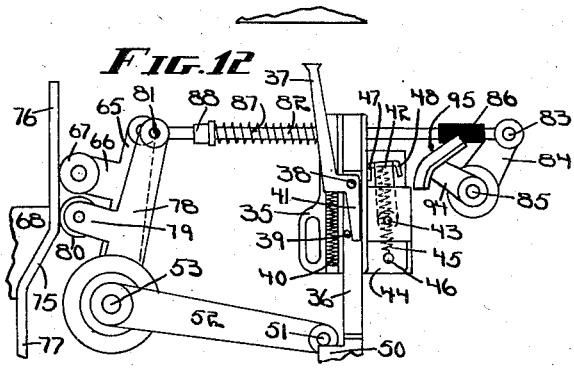
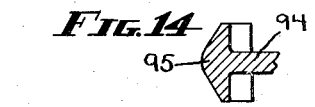
Inventor
Oscar U. Payne
Southgate Fry & Hawley
Attorneys Patented June 11, 1935

2,004,342

UNITED STATES PATENT OFFICE 2,004,342

WEFT DETECTING MECHANISM FOR DROP BOX LOOMS

Oscar V. Payne, Worcester, Mass., assignor to Crompton & Knowles Loom Works, Worcester, Mass., a corporation of Massachusetts Application July 16, 1934, Serial No. 735,317

15 Claims. (Cl. 139—233)

This application is a continuation in part of my prior application Serial No. 614,393 filed by me May 31, 1932 and relating to the same general subject matter.

This invention relates to devices for detecting substantial exhaustion of weft in a shuttle which is active or about to become active in a multi-shuttle drop box loom. The invention is particularly designed for use with loom stopping mechanism but may be adapted to initiate weft replenishment.

It is the general object of my invention to provide improved and simplified means for giving an indication of substantial weft exhaustion for the shuttle which is active or about to become active, and for determining such shuttle without dependence on the pattern mechanism of the loom.

To the accomplishment of this object in the preferred form, I provide a separate weft detector for each shuttle, each permanently associated with its assigned shuttle box, and I permit all of said detectors to move to detecting position prior to the picking of the active shuttle.

I also provide means by which one detector only completes an indication for any one position of the shuttle boxes, which indication is for the shuttle in active position or about to become active.

Further features of the invention relate to the provision of a device for holding an indication and of contact means to engage said device when the associated shuttle is about to be picked.

My invention further relates to arrangements and combinations of parts which will be hereinafter described and more particularly pointed out in the appended claims.

A preferred form of the invention is shown in the drawings, in which

Fig. 1 is a front elevation of portions of a loom having my improved detecting mechanism applied thereto;

Fig. 2 is a plan view of the parts shown in Fig. 1;

Fig. 3 is a detail sectional plan view, taken along the line 3—3 in Fig. 1;

Fig. 4 is an end elevation, looking in the direction of the arrow 4 in Fig. 1;

Figs. 5 and 6 are detail sectional front elevations, taken along the lines 5—5 and 6—6 in Fig. 4 respectively;

Fig. 7 is a detail sectional plan view, taken along the line 7—7 in Fig. 4;

Fig. 8 is a diagrammatic view showing the electrical circuit and connections;

Fig. 9 is a sectional side elevation of a setting device, taken along the line 9—9 in Fig. 2;

Figs. 10, 11 and 12 are diagrammatic plan views showing the method of operation of the invention;

Fig. 13 is a plan view of a contact member to be described, and

Fig. 14 is a partial sectional elevation thereof, taken along the line 14—14 in Fig. 13.

Referring to the drawings, I have shown portions of a drop box loom including a loom side 15 and a rock shaft 16 (Fig. 4) upon which a lay is mounted in the usual manner. The lay is provided with a lay end 17 fixed thereto and having vertical guideways 18 (Fig. 2) for a set of drop boxes 20, indicated in Fig. 4 as comprising four compartments adapted to receive four superposed shuttles S.

The drop boxes 20 are mounted on the upper end of a lifter rod 22 (Fig. 4) guided at its lower end in a bearing 23 on a bracket or stand 24 secured to the end of the rock shaft 16. The lifter rod 22 and drop boxes 20 are moved vertically by a chain 25 controlled by suitable pattern and box-shifting mechanism not shown.

The parts thus far described are or may be of the usual commercial type and in themselves form no part of my present invention.

I provide a frame member or stand 30 (Figs. 1 and 4) secured by bolts 31 (Fig. 1) to upper and lower portions of the drop box structure 20. A frame member 32 is secured to the front of the stand 30 and is provided with four laterally projecting arms or supports 33 (Fig. 1) on each of which a weft detecting device is mounted.

Each detecting device comprises a casing 35 (Fig. 2) adapted to be secured to one of the arms or supports 33 above described, and each detecting device has a slide 36 (Fig. 11) mounted in suitable guideways in its casing 35.

A detector 37 is pivoted at 38 on each slide 36 and is limited in movement relative thereto in one direction by a stop pin 39. A spring 40 yieldingly holds the detector 37 in the position shown in Figs. 2, 11 and 12.

When the detector 37 engages a bobbin having a sufficient supply of weft thereon, the detector is held thereby from side slipping movement and is pushed directly forward by the lay, thereby moving the slide 36 along its guideways in the casing 35 but without any turning movement of the detector 37.

If, however, the supply of weft on the bobbin is substantially exhausted, the detector 37 will slide along the butt of the bobbin, moving to the position indicated in Fig. 10. This causes a forwardly extending portion 41 of the detector 37 to swing outward, during which movement it engages a setting device 42 forming part of an electrical circuit which controls the stopping of the loom.

The setting device 42 (Figs. 9 and 10) is pivoted on studs 43 mounted in upper and lower portions of a U-shaped supporting plate 44 (Figs. 1 and 9), which plate is clamped beneath or secured to the associated casing 35 and is held in fixed position relative thereto.

A spring 45 is connected at one end to a stud 46 on the plate 44 and at the other end to the inside of the setting device 42 at the free end thereof. The device 42 is also provided with wing portions 47 and 48 at its free end. The wing 47 normally engages the side of the casing 35 as a stop or abutment, as shown in Fig. 12, and is thus positioned for engagement by the part 41 of the feeler 37 when the feeler side-slips to the position shown in Fig. 10. When thus engaged, the setting device 42 is swung to the right, as viewed in Fig. 10, and this movement is continued by the spring 45 as soon as the device 42 passes its dead center with respect to the studs 43 and 46.

The final or operative position of the setting device 42 is determined by engagement of the device with the outer end portion of the U-shaped supporting plate 44 (Fig. 1), this position being also indicated in Figs. 10 and 11. With this construction, the setting device 42, having been moved to the indicating position shown in Fig. 10 by side-slipping of the feeler 37, will then remain in indicating position, even after the return of the feeler 37 to the normal position shown in Fig. 11.

It is necessary that the weft detectors should be normally withdrawn forwardly out of the path of the vertically shifting shuttle boxes and for this purpose I provide special mechanism shown in detail in Figs. 1 to 5.

I provide each detector slide 36 with an offset end portion 50 (Fig. 2) positioned for engagement by an upright rod 51 (Fig. 1) mounted in arms 52 secured to a rock shaft 53. The shaft 53 is rotatable in a bearing 54 (Fig. 1) formed at the outer end of an arm 55 (Fig. 2) preferably integral with the stand 32 previously described.

At its lower end the rock shaft 53 (Fig. 5) is secured to a splined sleeve 60 slidable axially in a similarly splined bushing 61 (Figs. 5 and 7). The bushing 61 is rotatable in a bearing 62 formed on a bracket 63 (Fig. 1) secured to the under side of the lay end 17.

An arm 65 (Fig. 3) is secured to the lower end of the bushing 61, as indicated in Figs. 3, 4 and 5, and is provided with an offset projection 66 supporting a cam roll 67 positioned to engage a cam plate 68. The plate 68 (Fig. 1) is mounted on a bracket 69 secured to the loom frame 15.

A plunger 70 (Fig. 3) is pivoted at 71 to the outer end of the arm 65 and extends through a bearing 72 depending from the bracket 63 (Fig. 1) which is fixed to the lay end 17. A coil spring 73 is mounted on the plunger 70 between the bearing 72 and a collar 74 fixed on the plunger 70, the spring acting to yieldingly force the cam roll 67 against the cam plate 68.

The cam plate 68 has an inclined portion 75, a raised portion 76 and a depressed portion 77. As the lay moves rearward from front center, the roll 67 will be engaged by the inclined cam portion 75, shifting the arm 65 from the position shown in Fig. 10 to the position shown in Fig. 11, and correspondingly shifting the arms 52 and upright rod 51, thus withdrawing the feelers 37 from the drop boxes.

As the lay thereafter again approaches front center from the rear, the spring 73 will cause the roll 67 to move downward along the inclined portion 75 to the depressed cam portion 77, again permitting the feelers to enter the drop boxes and shuttles.

It is essential that the drop boxes should have approached closely to picking position before the electrical circuit is completed, as otherwise an indication may be given for a shuttel not in active position or about to become active. Consequently I have provided a special contact member for closing the circuit following indication and after the lay has moved substantially rearward from front center.

For this purpose I provide an arm 78 (Figs. 4 and 5) loosely mounted on the bushing 61 and having an offset projection 79 (Fig. 2) supporting a cam roll 80, also positioned for engagement by the fixed cam plate 68. The outer end of the arm 78 is pivotally connected at 81 (Fig. 2) to one end of a link 82, the opposite end of which is similarly pivoted at 83 to an arm 84 secured to the lower end of an upright shaft 85 (Fig. 6). The link 82 is preferably formed in two parts connected by a sleeve 86 of insulating material for a purpose to be described.

A coil spring 87 (Fig. 12) is mounted between a collar 88 on the link 82 and a portion 89 (Fig. 1) of the bracket 63, thereby causing the roll 80 to yieldingly engage the cam plate 68.

The upright shaft 85 (Fig. 6) is supported in insulating bushings 90 and 91 in the ends of a tube 92 fixed in a bracket 93 (Fig. 1) secured to the bracket 63 previously described.

A contact member 94 (Fig. 13) is secured to the upper end of the shaft 85 and is provided with a contact portion 95 (Fig. 13) which is segmental in plan and which has the vertical section shown in Fig. 14, the upper and lower edge portions being rearwardly inclined or beveled.

As the shaft 85 is oscillated by the cam plate 68 through the cam roll 80, arm 78, link 82 and arm 84, the contact portion 95 of the member 94 engages the setting device 42 which is associated with the shuttle which is substantially in active position, provided said device has been moved to operative position by the associated detector 37.

It will be noted that the arm 94 (Fig. 1) is fixed vertically relatively to the lay end 17, while the setting devices 42 are shifted vertically with the shifting of the drop boxes. Swinging movement of the arm 94 not only completes the electrical circuit to be described, but also restores the device 42 to the normal inoperative position shown in Figs. 2 and 12. The beveled faces of the contact portion 95 of the member 94 assist in the resetting operation.

The circuit thus completed may be utilized to put in operation any usual electrical control device for stopping the loom or effecting weft replenishment. In Fig. 8 I have indicated diagrammatically a well-known mechanism for stopping a loom. I have shown a battery B, one side of which is grounded at G and the other side of which is connected through a wire 100 to a solenoid coil 101, which in turn is connected through a switch 102 and wire 103 to the arm 84 (Figs. 1 and 6) at the lower end of the upright shaft 85.

The shaft 85 is electrically connected through the member 94 to the segmental contact portion 95 which engages the setting device 42 upon indication of weft exhaustion and thereby completes the circuit through the ground G', thus energizing the solenoid 101. This causes the solenoid plunger to raise an arm 105 into the path of an actuating lever 106 oscillated by a cam 107 on the usual top or crank shaft 108 of the loom.

The arm 105 is pivoted to a lever 110 mounted on a fixed pivot 111 and connected by a link 112 to the usual knock-off lever 113 of the loom. When the arm 105 is raised by the solenoid plunger, it is temporarily retained in raised position by a latch 115. The upper end of the lever 110 is connected to the switch 102 in the magnet circuit.

The operation of this loom stopping mechanism is as follows:

The arm 105 is normally in lowered position out of the path of the actuating lever 106 and with the latch 115 inoperative. When the segmental portion 95 engages a setting device 42 which is in operative position, the circuit is completed, the solenoid is energized, the arm 105 is raised, the lever 110 is pushed to the right on the next actuation of the lever 106 and the knock-off lever 113 is actuated to stop the loom.

At the same time the switch 102 is withdrawn, thus breaking the circuit previously described, and the circuit remains broken until the knock-off lever is returned to running position.

The timing of the several movements may be substantially varied but is in general as follows:—

Each detector 37 engages its bobbin as the lay approaches front center and in case of a substantially exhausted bobbin, the parts move to the position shown in Fig. 10 approximately at front center, the setting device 42 thereafter remaining in position to complete an indication, as shown in Fig. 11.

As the lay starts rearward from front center the boxes are shifted, and the roll 67 is actuated by the cam plate 68 near the beginning of the backward stroke to cause forward withdrawal of the detectors 37 from the shuttle boxes, thus avoiding interference with the picking of any shuttle.

Thereafter and at some point between front center and top center the roll 80 is actuated by the cam plate 68, swinging the contact portion 95 of the member 94 against the setting device 42, thus completing the solenoid circuit and also re-setting the device 42.

The arm 105 is raised by the solenoid and is thereafter held in raised position by the latch 115 until the lay reaches approximate back center, at which point the cam 107 and lever 106 operate to stop the loom.

By the provision of the setting device 42 and the further provision of the latch 115, I avoid the necessity of close timing of the movements of the various parts, and I am able to use a cam plate 68 having an easy and gradual inclined portion 75. This enables me to move the contact portion 95 relatively slowly past the setting device 42, thus affording ample time for energizing the solenoid coil 101.

Having thus described my invention and the advantages thereof, I do not wish to be limited to the details herein disclosed, otherwise than as set forth in the claims, but what I claim is:—

1. In a loom having a plurality of drop boxes, in combination, a plurality of weft detectors each permanently associated with a particular drop box, a stand for said detectors movable with said boxes, detector-withdrawing means to separately engage each of said detectors and to move each detector forward relatively to said stand to inoperative position during each loom cycle, means to release all of said detectors at a predetermined point in said loom cycle for independent rearward movement to detecting position, and means through which the detector associated with the shuttle about to be picked may complete an indication of substantial weft exhaustion.

2. In a loom having a plurality of drop boxes, in combination, a stand mounted on the lay and connected to move at all times in unison with said boxes, the paths of movement of said stand and boxes being at all times parallel, a separate weft detector mounted on said stand opposite each drop box, means to simultaneously withdraw all of said detectors relative to said stand from operative position during a major portion of each loom cycle and to thereafter permit said detectors to be moved to detecting position, and means to indicate substantial weft exhaustion for that shuttle only which is about to be picked.

3. In a loom having a plurality of drop boxes, in combination, a separate side-slipping weft detector permanently associated with each drop box, and means to simultaneously withdraw all of said weft detectors from operative position for a major portion of each loom cycle, said means comprising a fixed cam plate having raised and depressed portions and a cooperating cam follower mounted to swing with the lay and connected to withdraw said weft detectors.

4. In a loom having a plurality of drop boxes, in combination, a plurality of weft detectors each permanently associated with a particular drop box, a setting device for each detector movable to operative position when its detector indicates substantial weft exhaustion in a shuttle, means to hold said setting device in operative position after said detector is disengaged from the weft in the indicated shuttle, and means to thereafter engage said setting device when the indicated shuttle is about to be picked and to thereby effect stopping of the loom.

5. In a loom having a plurality of drop boxes, in combination, a plurality of weft detectors each permanently associated with a particular drop box, a setting device for each detector movable to operative position when its detector indicates substantial weft exhaustion in a shuttle, means to hold said setting device in operative position after said detector is disengaged from the weft in the indicated shuttle, and a single contact member positioned to thereafter engage one of said setting devices but only when said setting device is in operative position and is associated with an indicated shuttle about to be picked, such engagement of said setting device effecting stopping of the loom.

6. In a loom having a plurality of drop boxes, in combination, a plurality of weft detectors each permanently associated with a particular drop box, a setting device for each detector movable to operative position when its detector indicates substantial weft exhaustion in a shuttle, means to hold said setting device in operative position, and a single contact member positioned to thereafter engage one of said setting devices but only when said setting device is in operative position and is associated with an indicated shuttle about to be picked, such engagement of said setting device effecting stopping of the loom and also returning said setting device to initial inoperative position.

7. In a loom having a plurality of drop boxes, in combination, a plurality of weft detectors each permanently associated with a particular drop box, a stand for said detectors movable with said boxes, detector-withdrawing means to separately engage each of said detectors and to move each detector forward relatively to said stand to inoperative position during each loom cycle, means to release all of said detectors at a predetermined point in said loom cycle for independent rearward movement to detecting position, a setting device for each detector movable thereby to operative position when its detector indicates substantial weft exhaustion in a shuttle, means to hold said setting device in operative position, and means to thereafter engage said setting device and thereby effect stopping of the loom.

8. The combination in a loom as set forth in claim 7, in which a single cam device is provided to actuate said detector-withdrawing means and said setting-device-engaging means.

9. The combination in a loom as set forth in claim 7, in which a single cam device is provided to actuate said detector-withdrawing means and said setting-device-engaging means in predetermined timed relation.

10. The combination in a loom as set forth in claim 7, in which a single cam device is provided to actuate said detector-withdrawing means and said setting-device-engaging means, said withdrawing means being actuated before said setting device is engaged.

11. The combination in a loom as set forth in claim 7, in which said detector-withdrawing means and said setting-device-engaging means are each provided with a cam follower, and in which a single fixed cam is successively engaged by said two cam followers.

12. In a loom having a plurality of drop boxes, in combination, a plurality of weft detectors each permanently associated with a particular drop box, a setting device for each detector movable to operative position when its detector indicates substantial weft exhaustion in a shuttle, means to hold said setting device in operative position, means to thereafter engage said setting device when the indicated shuttle is about to be picked and to thereby effect stopping of the loom, and a fixed cam device to actuate said setting-device-engaging means.

13. In a loom having a plurality of drop boxes, in combination, a plurality of weft detectors each permanently associated with a particular drop box, a setting device for each detector movable thereby to operative position when its detector indicates substantial weft exhaustion in a shuttle, means to hold said setting device in operative position, and means to thereafter engage said setting device when the indicated shuttle is about to be picked and to thereby effect stopping of the loom and simultaneous return of said setting device to normal inoperative position.

14. In a loom having a plurality of drop boxes, in combination, a plurality of weft detectors each permanently associated with a particular drop box, a setting device for each detector movable to operative position when its detector indicates substantial weft exhaustion in a shuttle, means to hold said setting device in operative position, means to thereafter engage said setting device when the indicated shuttle is about to be picked and to thereby effect stopping of the loom and return of said setting device to normal inoperative position and a single spring yieldingly holding said setting device in either operative or inoperative position.

15. In a loom having a plurality of drop boxes, in combination, a plurality of weft detectors each permanently associated with a particular drop box, a separate setting device for each detector effective to store an indication of weft exhaustion by its detector after disengagement thereof from the weft in the indicated shuttle, and means to complete the indication by engagement of said setting device by said means and to thereby stop the loom when the indicated shuttle is next about to be picked.

OSCAR V. PAYNE.